(12) United States Patent
Tank

(10) Patent No.: US 7,496,217 B2
(45) Date of Patent: Feb. 24, 2009

(54) METHOD AND IMAGE PROCESSING SYSTEM FOR SEGMENTATION OF SECTION IMAGE DATA

(75) Inventor: Martin Tank, Heidelberg (DE)

(73) Assignee: Siemens Aktiengesellschaft, Munich (DE)

( * ) Notice: Subject to any disclaimer, the term of this patent is extended or adjusted under 35 U.S.C. 154(b) by 756 days.

(21) Appl. No.: 11/006,781

(22) Filed: Dec. 8, 2004

(65) Prior Publication Data

US 2005/0123197 A1 Jun. 9, 2005

(30) Foreign Application Priority Data

Dec. 8, 2003 (DE) ................ 103 57 206

(51) Int. Cl.
*G06K 9/00* (2006.01)
(52) U.S. Cl. ................ 382/128; 382/154; 382/228
(58) Field of Classification Search ................ 382/100, 382/128, 131, 132, 154, 173, 181, 190, 195, 382/199, 276; 378/20; 600/410; 392/217, 392/228
See application file for complete search history.

(56) References Cited

U.S. PATENT DOCUMENTS

| 6,002,782 | A | 12/1999 | Dionysian |
| 6,028,907 | A * | 2/2000 | Adler et al. ................ 378/4 |
| 6,195,409 | B1 * | 2/2001 | Chang et al. ............... 378/20 |
| 7,242,793 | B2 * | 7/2007 | Trobaugh et al. .......... 382/128 |
| 2001/0026272 | A1 | 10/2001 | Feld et al. |
| 2001/0033283 | A1 * | 10/2001 | Liang et al. ............... 345/424 |
| 2003/0020714 | A1 * | 1/2003 | Kaus et al. ................ 345/423 |
| 2003/0160786 | A1 * | 8/2003 | Johnson .................... 345/419 |

FOREIGN PATENT DOCUMENTS

| WO | WO 01/78005 | * 10/2001 |
| WO | WO 2004/075112 | * 9/2004 |

OTHER PUBLICATIONS

Shen, D. et al., "HAMMER: Hierarchical Attribute Matching Mechanism for Elastic Registration", Nov. 2002, IEEE Transactions on Medical Imaging, vol. 21, No. 11, pp. 1421-1439.*
Ginneken, Bram van et al., "Active Shape Model Segmentation With Optimal Features", Aug. 2002, IEEE Transactions on Medical Imaging, vol. 21, No. 8, pp. 924-933.*

* cited by examiner

Primary Examiner—Andrew W Johns
(74) Attorney, Agent, or Firm—Harness, Dickey & Pierce, P.L.C.

(57) ABSTRACT

A method is for segmentation of section image data of an examination object, in which a target structure is determined in the section image data and an anatomical norm model is selected whose geometry can be varied on the basis of model parameters. The model parameters are organized hierarchically on the basis of their influence on the anatomical overall geometry of the model. The norm model is matched to the target structure for individualization purposes in a number of iteration steps, with the number of model parameters which can be set being increased in accordance with the hierarchical organization as the number of iteration steps increases. Finally, all of those pixels within the section image data are selected which lie within a contour of the individualized model or of model part, or which differ from this by at most a specific difference value. A corresponding image processing system is also described.

30 Claims, 8 Drawing Sheets

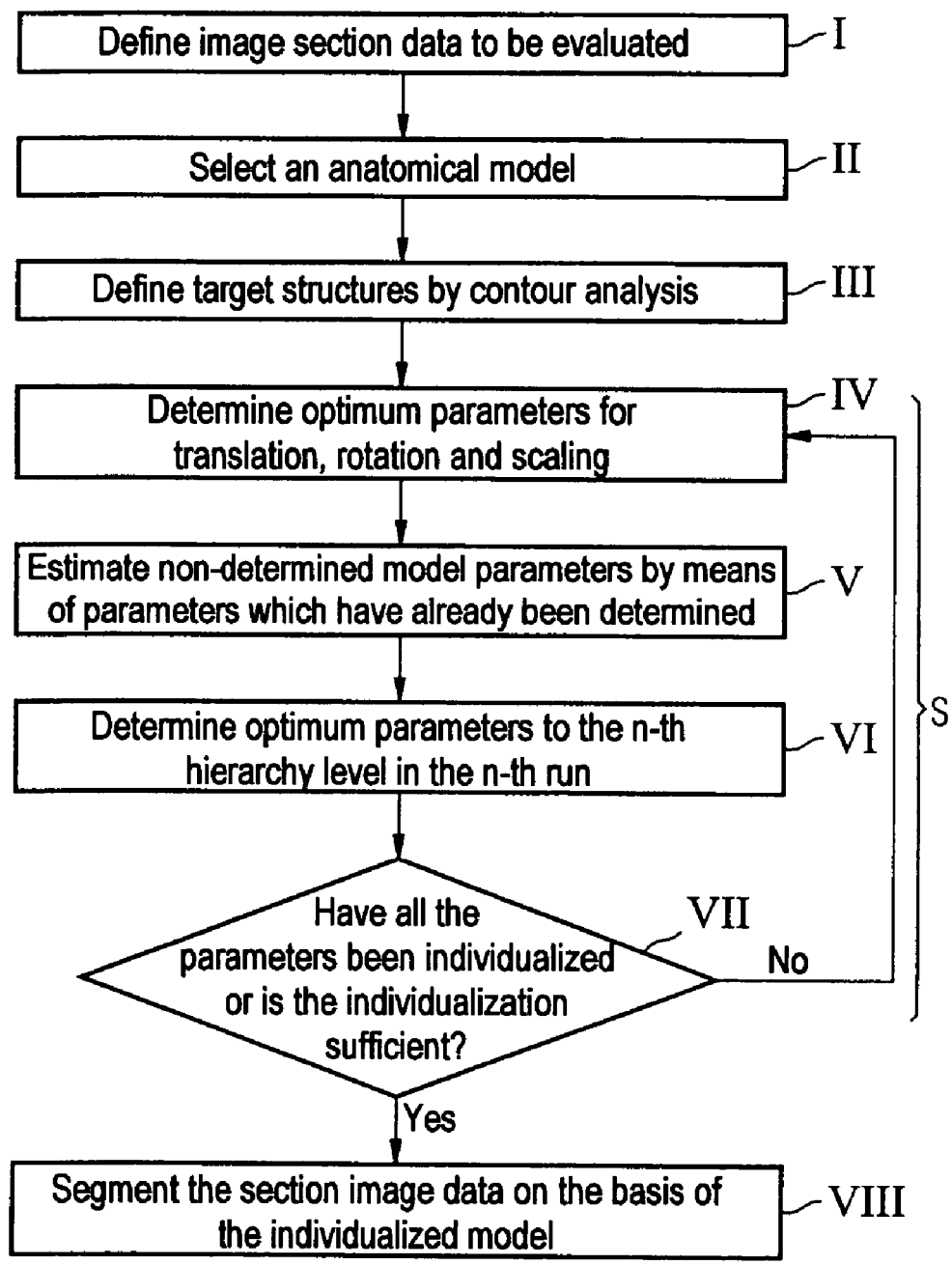

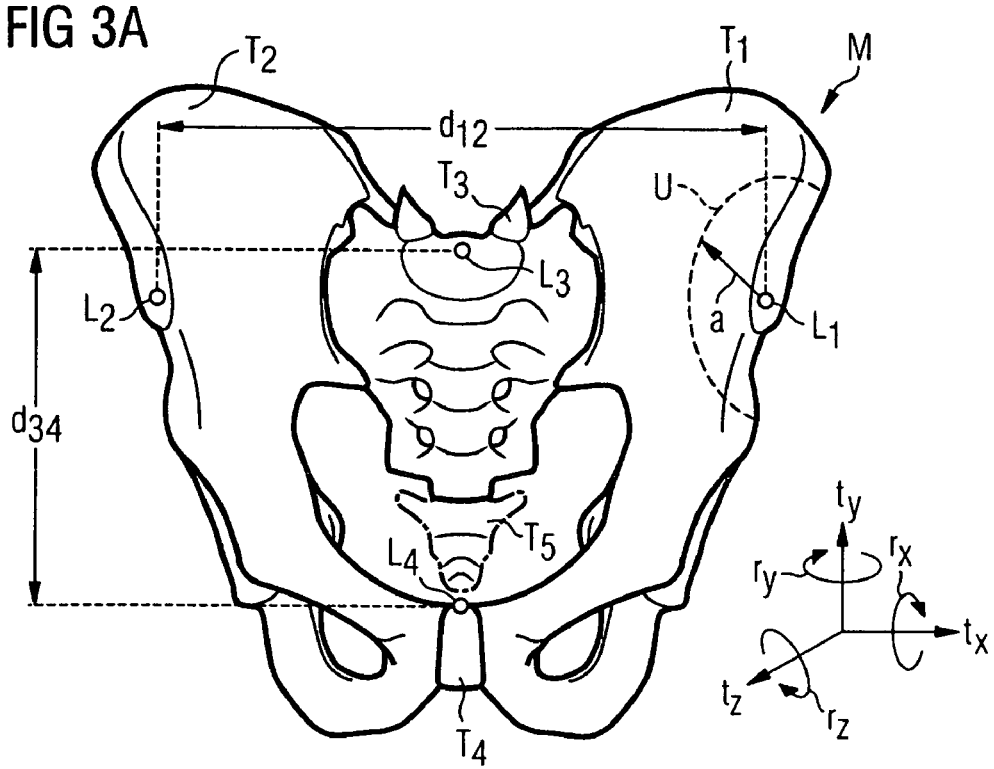
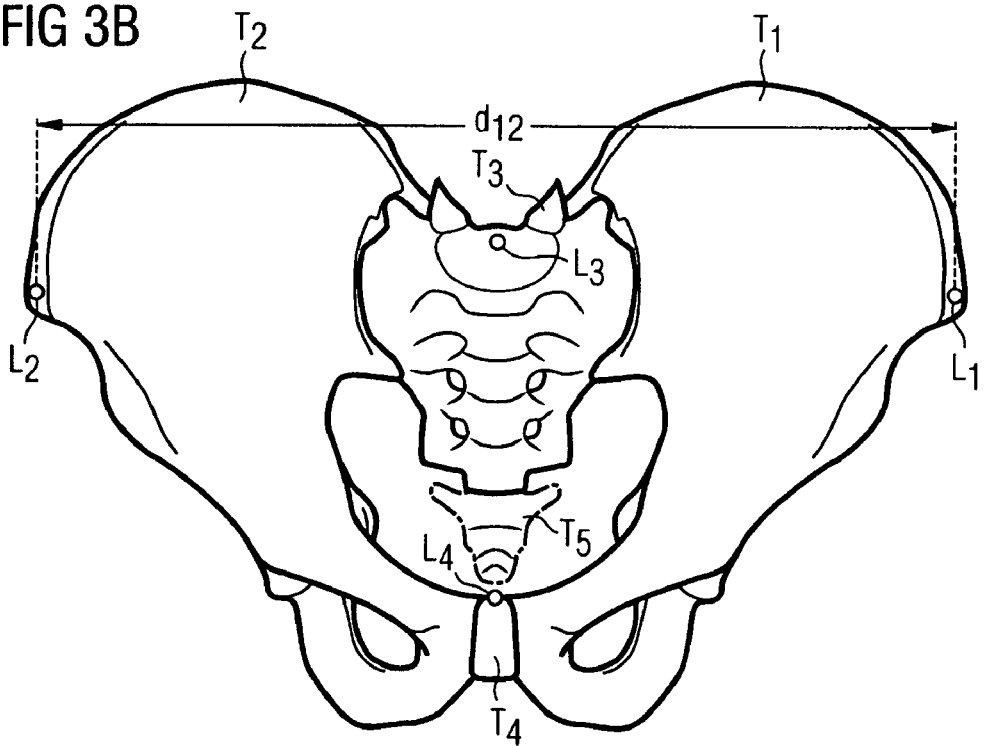

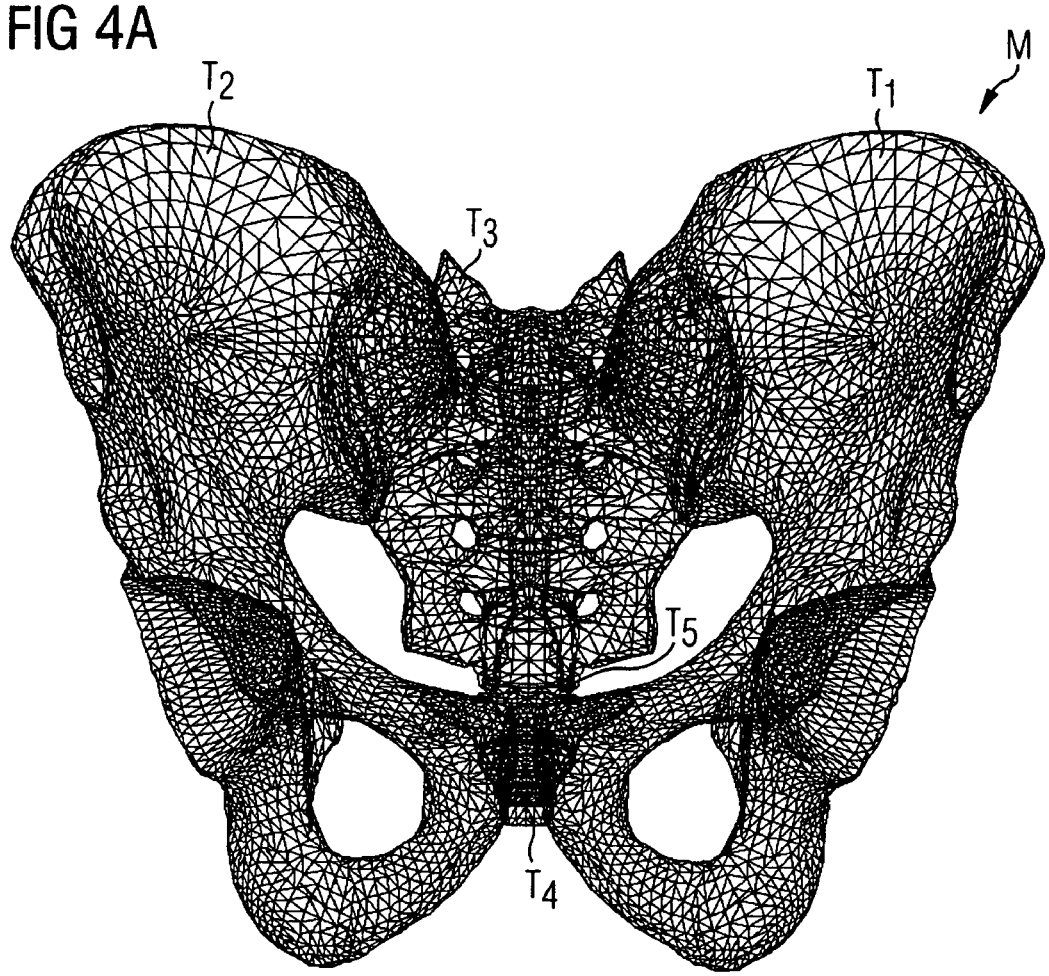

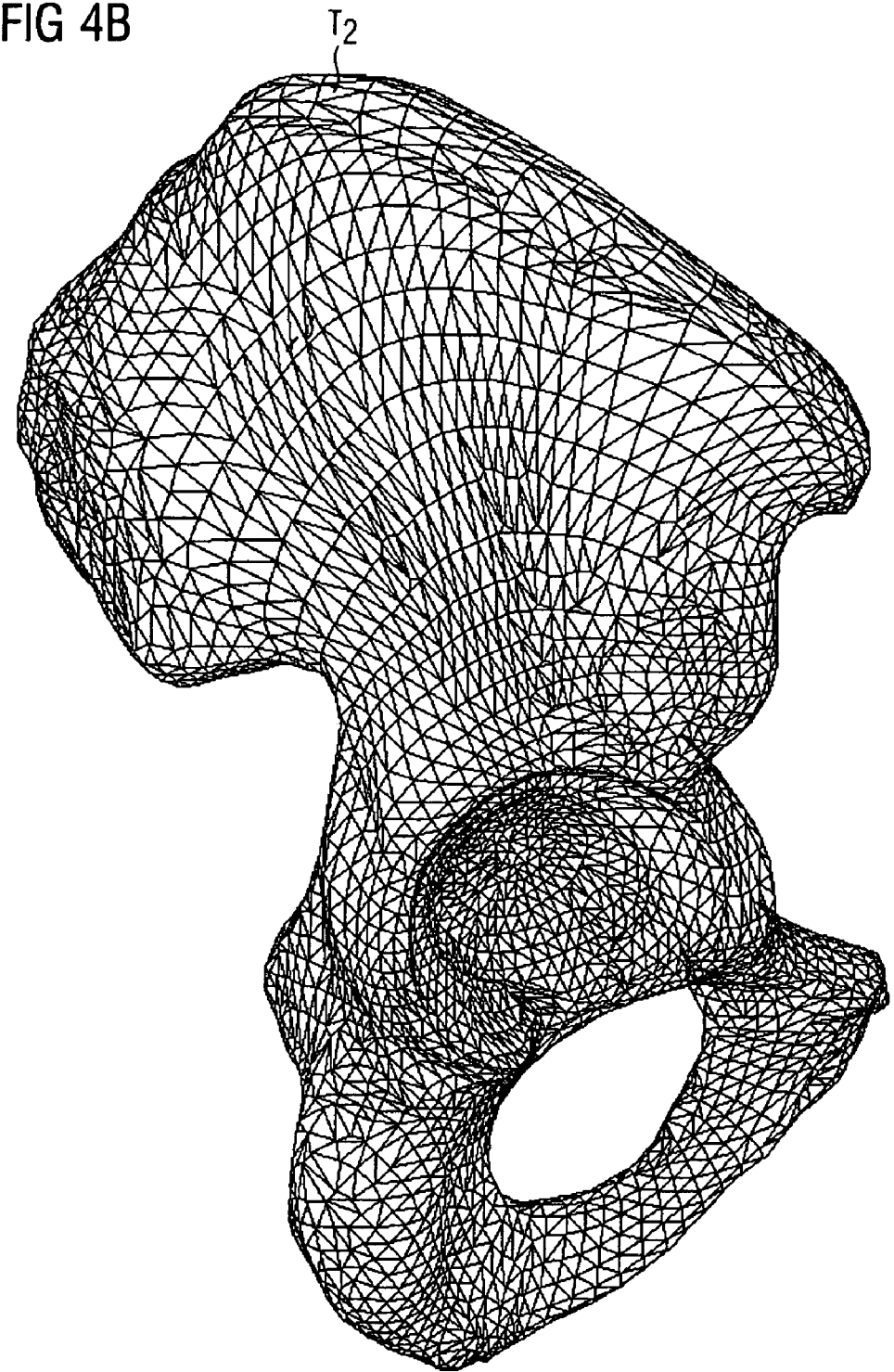

METHOD AND IMAGE PROCESSING SYSTEM FOR SEGMENTATION OF SECTION IMAGE DATA

The present application hereby claims priority under 35 U.S.C. §119 on German patent application number DE 103 57 206.6 filed Dec. 8, 2003, the entire contents of which are hereby incorporated herein by reference.

FIELD OF THE INVENTION

The invention generally relates to a method for segmentation of section image data of an examination object with the aid of a model based on parameters. The invention also generally relates to a method for production of a model based on parameters for use in a segmentation method such as this and to an image processing system by which a method such as this can be carried out.

BACKGROUND OF THE INVENTION

The result of investigations by means of modalities which produce section images, such as CT scanners, magnetic resonance appliances and ultrasound appliances generally include a number of series with a large number of section images of the relevant examination object. For further planning of the examination and/or in order to produce a diagnosis, this section image data must in many cases be processed further during the examination itself, or immediately after the examination. The so-called "segmentation" of anatomical structures plays a major role in the further processing of this section image data. A segmentation process such as this is used to break down the image data of the examination object such that specific object elements of an examination object, that is to say specific anatomical structures which are the focal point of the respective examination, are separated from the rest of the image data. One obvious example of this is separation of the bone structure of the pelvis from a CT or MR section image data record of a patient's lower body.

A further example is contrast agent angiography by way of computed tomography. In an examination such as this it is worthwhile, and maybe absolutely essential, to remove the interfering bone components from the volume data record in order subsequently to make it possible to produce diagnostically valid MIP representations (MIP=Maximum Intensity Projection) or other result images. This is particularly important for those examinations in the area of the skull or spinal column. Good segmentation of the already existing section image data also plays an important role in other areas of angiography, for operation planning or else for selecting the modality for further detailed images of an anatomical structure that is of interest.

One relatively simple segmentation algorithm is the so-called "threshold value method". This method operates in such a way that the intensity values (which are referred to as "Hounsfield values" in computer tomography) of the individual voxels, that is to say of the individual 3-D pixels, are compared with a fixed threshold value setting. If the value of the voxel is above the threshold value, then this voxel is added to a specific structure. However, this method can be used for magnetic resonance scans, particularly for contrast agent examinations or in order to separate the external skin surface from the environment.

In the case of computed tomography scans, this method may additionally also be used for separation of bone structures. This method is not suitable for separation of other tissue types. Furthermore, unfortunately, in many cases it is also impossible to use this method to separate different adjacent bone structures from one another, for example in order to separate the joint cavity in the pelvis structure from the joint head of the femur when scanning a hip joint, and to view these object elements separately. Furthermore, a simple threshold value method such as this often cannot be used reliably due to so-called partial volume effects and metal artifacts, which ensure that parts of the surface of the object element to be separated cannot be determined.

Thus, in many cases, only manual segmentation of the section image data is possible. Unfortunately, however, such manual segmentation is often very difficult to carry out owing to the complicated anatomy of the examination object, and is associated with a high time penalty.

In principle, the segmentation process can be improved by using so-called model-based methods, in which morphological knowledge of the examination object is included in the segmentation process.

Virtual models are already used in many fields of technology in order to simulate objects in specific states or to recognize objects again. By way of example, US 2001/0026272 A1 proposes a simulation method in which, taking into account mechanical and visual material characteristics of a piece of clothing, the physically correct fit of the relevant piece of clothing on the human body can be simulated. Furthermore, for example, U.S. Pat. No. 6,002,782 discloses a method for personal identification based on the correlation of recorded 2D images of the human face with simulated 2D images of already known optical 3D face scans, with the x axis of the 3D face scan being made to match the viewing direction of the camera associated with the 2D image.

The medical field, as well, already makes use of methods in order to produce virtual models of objects to be examined, on the basis of widely differing measurements, and these models can then be used as the basis for the further examination of the relevant object. By way of example, U.S. Pat. No. 6,028,907 describes a method in which a three-dimensional model of a spinal column to be examined is produced from two-dimensional CT section images and two-dimensional CT scout images.

In the case of the present problems of segmentation of section image data, image data which is missing, for example as a result of partial volume effects or metal artifacts, can be compensated for by matching a model to a target structure in the section image data (which includes the object element to be separated) in individual layers. This allows the complete reconstruction of the object element to be separated, for example the organ or the specific bone structure. However, in this method, the problem of segmentation is in the end changed to the problem of matching a model as well as possible to a target structure in the section image data.

SUMMARY OF THE INVENTION

One object of an embodiment of the present invention is to provide a corresponding method and/or an image processing system for simple and reliable segmentation of section image data of an examination object using a model. In particular, an object is to provide one wherein the model can be matched to the target structure satisfactorily, and/or with as little time penalty as possible.

An object can be achieved by a method and/or an image processing system.

On the basis of the method according to an embodiment of the invention, a norm model which is based hierarchically on parameters and in which the model parameters are organized hierarchically on the basis of their influence on the anatomical overall structure of the model is in this case used as the anatomical norm model, whose geometry can be varied on the basis of model parameters and can thus be matched to the target structure.

The "individualization" of the norm model, that is to say the matching to the target structure, is in this case carried out in a number of iteration steps, with the number of model parameters which can be set at the same time in the respective iteration step, and thus the number of degrees of freedom for model variation—being increased corresponding to the hierarchical order of the parameters as the number of iteration steps increases. This method ensures that, during the individualization process, those model parameters which have the greatest influence on the anatomical overall geometry of the model are adjusted first of all. Only then may the lower-level model parameters, which influence only some of the overall geometry, be adjusted, on a gradual basis. This ensures an effective procedure, which is in consequence time-saving, for model matching.

Finally, once the model has been matched in the desired manner to the target structure—for example there are no longer any discrepancies between the model and the target structure or the discrepancies are minimal or are below a specific threshold value—all of those pixels within the section image data which are within a contour of the individualized model or of a model element, or which differ from this by at most a specific difference value are selected. The selection process may in this case be carried out removing the relevant pixels, or by removing all the other pixels, that is to say with the relevant pixels being cut out. A "model element" should in this case be regarded as a part of the individualized norm model, for example the skull base of a skull model.

For this purpose, an image processing system according to an embodiment of the invention requires an interface for reception of the section image data which has been measured by a modality and is to be segmented, a target structure determination unit for determination of the target structure in the section image data, a memory device with a number of corresponding anatomical norm models for different target structures in the section image data, with the model parameters being organized hierarchically on the basis of this influence on the anatomical overall geometry of the model, and a selection unit for selection of one of the anatomical norm models on the basis of the section image data to be segmented. Furthermore, the image processing system requires an adaptation unit in order to match the selected norm model to the target structure in the section image data for individualization purposes in a number of iteration steps, with the number of model parameters which can be set being increased in accordance with the hierarchical organization as the number of iteration steps increases. Finally, the image processing system requires a separation unit in order, finally, to select all of the pixels within the section image data which lie within a contour of the individualized model or of a model element, or which differ from this by at most a specific difference value.

The model parameters are preferably each associated with one hierarchy class. This means that different model parameters may possibly also be associated with the same hierarchy class since they have approximately the same influence on the anatomical overall geometry of the model. All of the model parameters in one specific hierarchy class can then be added for the first time in one specific situation step in order to be set. The model parameters in the hierarchy class below this are then added in the next iteration step, etc.

A model parameter may be associated with a hierarchy class on the basis of a discrepancy in the model geometry which occurs when the relevant model parameter is changed by a specific value. In this case, in one particularly preferred method, specific areas of discrepancies, for example numeral discrepancy intervals, are associated with different hierarchy classes. Thus, for example, a parameter is varied in order to place this parameter in a hierarchy class, and the resultant discrepancy between the geometrically changed model and the initial state is calculated. The extent of the discrepancy in this case depends on the nature of the norm model used.

One feature is that a precisely defined discrepancy measure should be determined which quantifies as accurately as possible the geometry change in the model before and after variation of the relevant model parameter, in order to ensure realistic comparison of the influence of the various model parameters on the model geometry. For this purpose, a standard step width is preferably used for each parameter type, that is to say for example for distance parameters, for which the distance between two points in the model is varied, or for angle parameters in which an angle between three points in the model is varied, in order to allow the geometry influence to be compared directly. The parameters are then split between the hierarchy classes simply by presetting numerical intervals for this discrepancy measure.

An uppermost hierarchy class whose model parameters can be set immediately in a first iteration step preferably contains at least those model parameters whose variation globally changes the norm model. These include, for example, the total of nine parameters relating to rotation of the overall model about the three model axes, the translation along the three model axes, and the scaling of the entire model on the three model axes.

The digital anatomical norm models which can be used may in principle be constructed in widely differing ways. One option, for example, is to model anatomical structures on a voxel basis, with specific software being required for editing of such volume data, although this software is generally expensive and is not widely used. Another option is to model so-called "finite elements", with a model generally being formed from tetrahedrons. However, specific and expensive software is also required for models such as these.

Simple modeling of anatomical boundary surfaces by triangulation is relatively widely used. The corresponding data structures are supported by a large number of standard programs from the computer graphics field. Models constructed on this principle are referred to as so-called surface-oriented anatomical models. This is the lowest common denominator for the modeling of anatomical structures since appropriate surface models can be derived not only from the first-mentioned volume models by triangulation of the voxels but also by changing the tetrahedrons in the finite element method into triangles.

It is thus possible to use surface-oriented models built on a triangle basis as norm models. First of all, this method allows the models to be produced very easily and at very low cost. Secondly, models which have already been produced in a different form, in particular the volume models which have been mentioned, can be adopted by appropriate transformation, so that there is then no need to create an appropriate model from new.

Section image scans, for example, can be segmented with corresponding effort using a classic manual method in order to create such surface models from new. Finally, the models can be generated from the information obtained in this way about the individual structures, for example individual organs. For example, in order to obtain human bone models, it is also possible to measure a human skeleton with the aid of laser scanners, or to scan them, to segment them and triangulate them by means of a CT scanner.

When using surface models produced on a triangle basis, the discrepancy between the unchanged norm model and the changed norm model after variation of one parameter is preferably calculated on the basis of the sum of the geometric distances between the corresponding triangles in the models in the various states.

The hierarchical organization of the individual model parameters may in principle be carried out during the segmentation of the section image data. It is then possible, for example, to first of all check in each iteration step which further model parameters have the greatest influence on the geometry, and then to add these parameters. However, since this is associated with considerable computation complexity, the classification or organization of the model parameters in the hierarchical order is particularly preferably done in advance, for example even while producing the norm model, but at least before the storage of the norm model in a model database or the like, for subsequent selection.

Thus, the model parameters are preferably organized in advance hierarchically on the basis of their influence on the anatomical overall geometry of the model, in an autonomous method for production of norm models, which are then available for use in said segmentation method. During this process, the model parameters can likewise be associated with corresponding hierarchy classes, with a parameter once again being associated with a hierarchy class on the basis of the discrepancy in the model geometry which occurs when the relevant model parameter is changed by a specific value.

This separation of the hierarchical arrangement of the model parameters into a separate method for production of a norm model has the advantage that the calculation of the hierarchical organization of model parameters need be carried out only once for each norm model, thus making it possible to save valuable computation time during the segmentation process. The hierarchical organization can be stored together with the norm model in a relatively simple manner, for example by organizing the parameters in hierarchy classes or by logically linking them with appropriate markers or the like in a file header, or by storing them at another normalized position in the file which also contains the further data for the relevant norm model.

There are various options for determination of the target geometry of the object element to be separated in the section image data. In one preferred method, the target geometry is at least partially determined automatically by way of a contour analysis method. Contour analysis methods such as these operate on the basis of gradients between adjacent pixels. Widely differing contour analysis methods are known to those skilled in the art.

The advantage of contour analysis methods such as these is that the methods can be used not only for CT scanner section image data but also for magnetic resonance section image data and for ultrasound section image data. One relatively good alternative is to use the threshold value method, which has already been described in the introduction and in which, for example, the intensity values of the individual pixels are analyzed to determine whether they exceed a specific threshold value. As has already been mentioned, this latter method is, however, suitable only for determination of the target geometries of the skin surface or for contrast agent examinations in CT and MR scans as well as for CT scans for determination of bone target structures.

In one particularly preferred variant, a current discrepancy value between the geometry of the modified norm model and of the target structure is in each case determined on the basis of a specific discrepancy function during the process of matching the norm model to the target structure. One possible calculation option is to add the squares of the minimum spatial distances between the model triangles and the target structure. This discrepancy value may be used in various way depending on whether the method is being carried out manually, semi-automatically or fully automatically.

In the case of a manual method, the individual model parameters may be offered the user for variation, for example by means of a graphic user interface, in each iteration step on the basis of their hierarchical organization.

In this case, the current discrepancy value is then preferably also indicated, so that the user will see immediately on variation of the relevant model parameter whether and to what extent the geometry discrepancies are reduced by his actions. In particular, in this case, it is also possible to determine discrepancy values individually for each model parameter and to indicate these instead of an overall discrepancy value, or in addition to it.

One typical example of this is to display the target structure and/or the norm model to be matched, or at least parts of these objects on a graphics user interface at a terminal, in which case the user may, for example, use the keyboard or a pointing device such as a mouse or the like to adapt a specific model parameter—for example the distance between two points on the model. A moving bar or some similar optically easily identifiable means is used to indicate to the user the extent to which the discrepancies are reduced by his actions, in particular displaying on the one hand the total discrepancy of the model and, on the other hand, the discrepancies relating to the adaptation of the specific current model parameter—for example in the case of the distance between two points in the model, its difference from the distance between the relevant points in the target structures.

In consequence, this method can also be used to achieve satisfactory discrepancy values with manual matching, in a convenient manner and with relatively little time penalties.

The discrepancy function can preferably also be used in order to carry out the matching process completely automatically or at least partially automatically. In an automatic matching method such as this, the model parameters are likewise changed iteratively on the basis of their hierarchical organization, with the discrepancy function being minimized overall.

Automatic matching may in this case be carried out completely in the background, so that the operator can carry out other work and, in particular, can process other image data in parallel, or can control further measurements, on a console of the image processing system which is carrying out the segmentation process. In this case, it is possible for the process to be displayed permanently, for example on a screen (part) while the method is being carried out automatically, so that the user can monitor the progress in the matching process. In this case, a current value of the discrepancy function, possibly only for the parameter which is currently being varied as well, is preferably once again displayed to a user. In particular, it is also possible to indicate the discrepancy values on the screen permanently, for example in a task bar or the like, while the rest of the user interface is free for other work by the user.

In one very particularly preferred exemplary embodiment, the model parameters are in each case logically linked to a position of at least one anatomical landmark of the model such that the model has an anatomically sensible geometry for each parameter set. Typical examples of this are, on the one hand, global parameters such as rotation or translation of the overall model, in which the positions of all of the model parameters are changed appropriately with respect to one another. Other model parameters are, for example, the distance between two anatomical landmarks or an angle between three anatomical landmarks, for example in order to determine a knee position.

Such coupling of the model parameters to medically sensibly selected anatomical landmarks has the advantage that a diagnostic statement can always be made after the individualization process. Furthermore, the positions of such anatomical landmarks are described exactly in the anatomical specialist literature. A procedure such as this therefore makes it easier to carry out the segmentation process, since a medically trained user, for example a doctor or an MTA, is familiar with the anatomical landmarks, and these essentially determine the anatomy.

By way of example, the human pelvis can be described in a known manner by the following variables:

Distantia cristarum

Distantia spinarum

Diameter spinarum posterior

Diameter transversa of the pelvis width

Diameter transversa of the pelvis narrow section

Diameter transversa of the pelvis inferior aperture

Diameter sagittalis of the pelvis width

Diameter sagittalis of the pelvis narrow section

Diameter sagittalis of the pelvis inferior aperture

Conjugata anatomica

Conjugata diagonalis

Conjugata vera with these variables in turn being derived from a generally known set of anatomical landmarks.

The selection unit, the adaptation unit and the separation unit for the image processing system may particularly preferably be in the form of software in an appropriately suitable image computer processor. This image computer should have an appropriate interface for reception of image data and a suitable memory device for anatomical norm models. In this case, this memory device need not necessarily be an integrated part of the image computer, and it is sufficient for the image computer to be able to access this and appropriate external memory device. An implementation of the method according to the invention in the form of software has the advantage that existing image processing systems can also be retrofitted appropriately and in a relatively simple manner, by suitable updates. The image processing system according to the invention may, in particular, also be a drive unit for the modality which records the section image data itself, and has the necessary components for processing of the section image data according to the invention.

A separate method according to an embodiment of the invention, which is carried out before the segmentation process, in order to produce a norm model in which the model parameters are organized hierarchically on the basis of their influence on the anatomical overall geometry of the model, may likewise also be in the form of suitable software on a computer. In particular, in this case, it is also possible for the image processing system which carries out the segmentation process on the image data to be used for production of the norm models. By way of example, free computation capacities could be used at specific times at which the image processing system is loaded only lightly by current tasks in order to produce norm models with hierarchically organized model parameters, and to store them in a database for subsequent use.

BRIEF DESCRIPTION OF THE DRAWINGS

The invention will be explained in more detail in the following text using exemplary embodiments and with reference to the attached drawings, in which:

FIG. 2 shows a flowchart in order to illustrate one possible procedure for the segmentation method according to an embodiment of the invention, FIG. 3a shows a three-dimensional surface model of a human pelvis, FIG. 3b shows the surface model illustrated in FIG. 3a, with an extended distantia spinarum, FIG. 4a shows an illustration of the human pelvis as shown in FIG. 3a, as a surface model on a triangle basis, FIG. 4b shows an illustration of the right-hand section of the pelvis bone as shown in FIG. 4a, FIG. 5a shows an illustration of the target structures of a human skull in the section image data of a CT scanner.

DETAILED DESCRIPTION OF THE EXEMPLARY EMBODIMENTS

Figure 1:
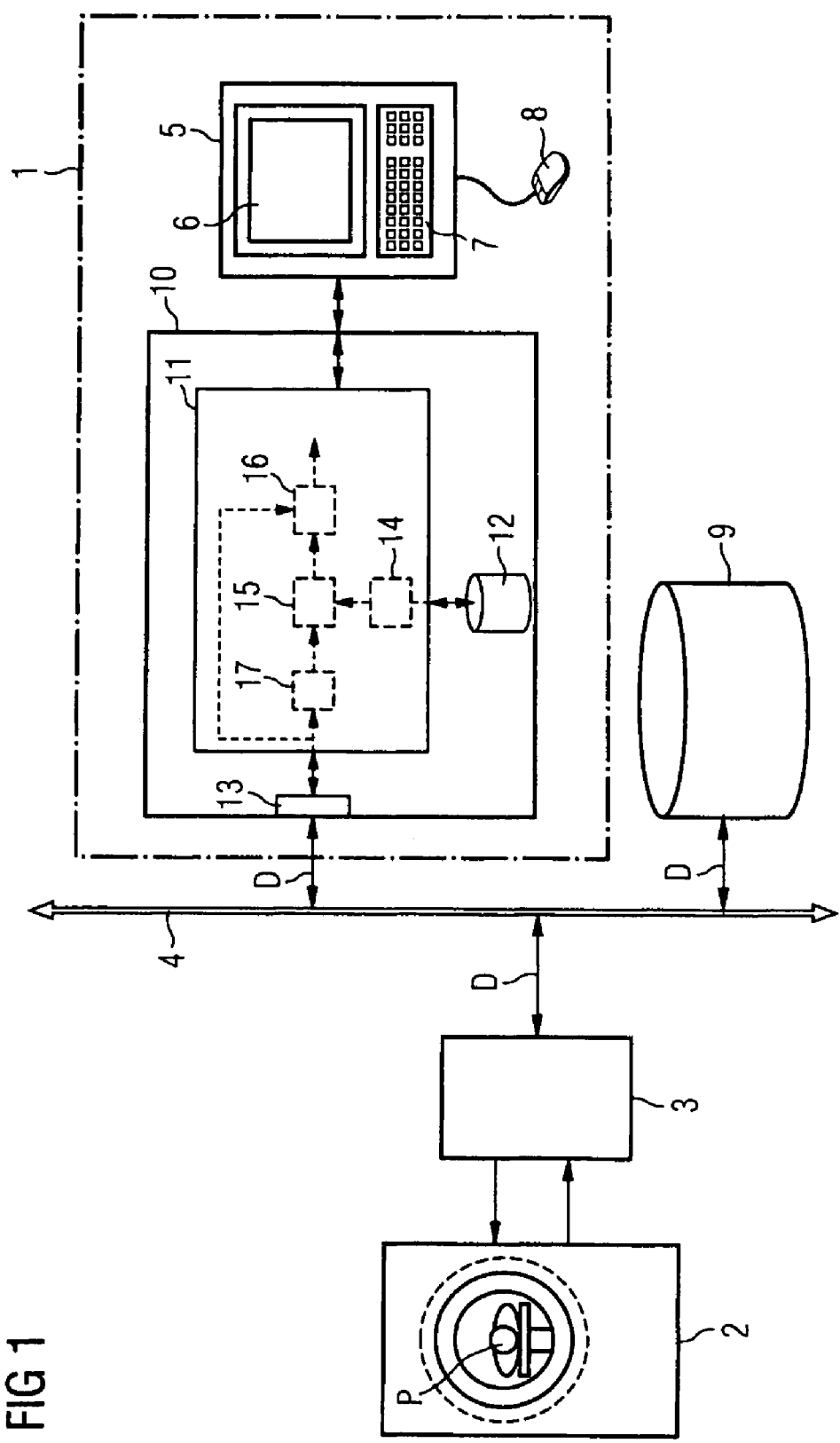
FIG. 1 shows a systematic illustration of one exemplary embodiment of an image processing system according to the invention, which is connected via a data bus to a modality and to an image data memory.

The exemplary embodiment of an image processing system 1 according to the invention as illustrated in FIG. 1 essentially comprises an image computer 10 and a console 5 or the like connected to it, with a screen 6, a keyboard 7 and a pointing device, in this case a mouse 8. The image computer 10 may be a computer constructed in the normal manner, for example a workstation or the like, which can also be used for other image evaluation processes and/or for controlling image scanners (modalities) such as CT scanners, magnetic resonance image scanners, ultrasound appliances, etc. The major components within this image computer 10 are, inter alia, a central processor 11 and an interface 13 in order to receive section image data D for a patient P which has been measured by a modality 2, in this case a magnetic resonance image scanner.

In the exemplary embodiment illustrated in FIG. 1, the modality 2 is connected to a control device 3 which is in turn connected to a bus 4, to which the image processing system 1 is also connected. Furthermore, a bulk memory 9 for temporary storage or for permanent storage of the images recorded by the modality 2 and/or for the image data processed further by the image processing system 1 is connected to this bus 4. Other components included in conventional radiological information systems (RIS), for example further modalities, bulk memories, workstations, output devices such as printers, filming stations, or the like, may, of course, also be connected to the bus 4 in order to form a larger network. A connection to an external network or to further RISs is likewise possible. All of the data is in this case preferably formatted for communication between the individual components using the so-called DICOM Standard (DICOM=Digital Imaging and Communication in Medicine).

The modality 2 is normally driven via the control device 3, which also acquires the data from the modality 2. The control device 3 may have its own console or the like for operation in situ, although this is not illustrated here. However, it is also possible for it to be controlled via the bus by way of a separate workstation which is located in the vicinity of the modality.

FIG. 2 illustrates one typical procedure for a segmentation method according to an embodiment of the invention.

First of all, the section image data to be evaluated is defined in a first method step I. The section image data D may, of example, be supplied directly from the modality 2 or its control device 3 via the bus 4 to the image computer 10. However, this may also be section image data D which has already been recorded at an earlier time, and has been stored in a bulk memory 9.

A norm model M for the section image data D to be segmented is then selected for segmentation in a step II. Thus, an anatomical norm model is selected in accordance with a questionnaire on which the segmentation process is based. For example, a skull model is selected for segmentation of section image scans of a skull, a pelvis model is selected for segmentation of section image scans of a pelvis bone structure, and a knee model is selected for segmentation of section image scans of a knee. For this purpose, image computer 10 has a memory 12 with widely differing norm models for different possible anatomical structures. These may be models which comprise a number of object elements.

One example of a norm model M which comprises a number of individual object elements is the pelvis norm model that is illustrated in FIGS. 3a and 3b, and whose distantia spinarum has already been changed. As separable object elements, this includes the left-hand pelvis bone $T_1$ (Os coxae sinister), the right-hand pelvis bone ($T_2$ (Os coxae dexter), the sacrum $T_3$ (Os sacrum), the symphysis ($T_4$ (Symphysis pubica) and the coccyges $T_5$ (Os coccyges). In order to assist operator clarity, the model M is displayed with a smooth surface on a user interface, as in FIGS. 3a and 3b. The model on which this illustration is based and which is used for segmentation is a surface model on a triangle basis. FIG. 4a shows a corresponding illustration of the pelvis model M as shown in FIG. 3b. FIG. 4b shows the right-hand pelvis bone $T_2$ from the side, looking at the joint cavity.

In a further step III, which may also be carried out in parallel with or before the method step II for model selection, target structures Z are defined within the section image data D. This may be done fully automatically, semi-automatically or completely manually, for example with the aid of contour analysis, as has already been mentioned. A threshold value method may also be used for certain structures and certain scanning methods, as has already been described further above.

The model M is in this case selected automatically by way of a selection unit 14 on the basis of the segmentation task, which, by way of example, can be predetermined via the console 5 manually at the start of the segmentation method, and the determination of a target structure Z by means of a target structure determination unit 17, which is in this case in the form of software in the processor 11 in the image computer 10.

Figure 5A:
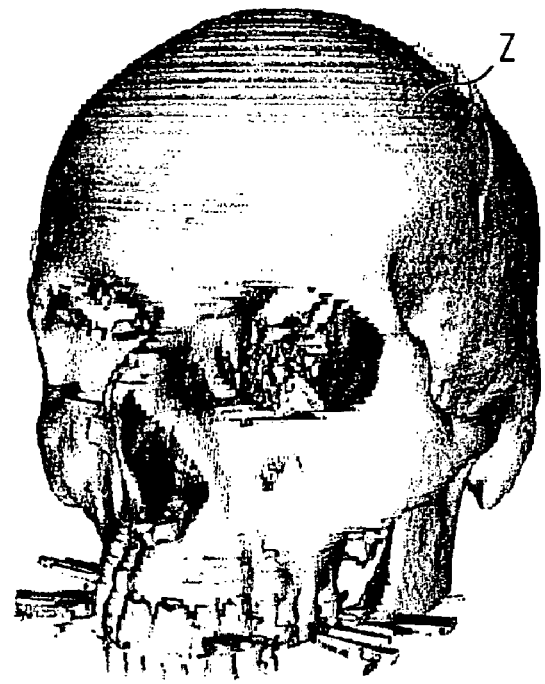
FIG. 5b shows the target structures as shown in FIG. 5a with a surface norm model which is not yet been adapted.
FIG. 5c shows an illustration of the target structures and of the norm model as shown in FIG. 5b, but with the norm model having been partially matched to the target structure.
FIG. 5d shows an illustration of the target structures and of the norm model as shown in FIG. 5c, but with the norm model having been further matched to the target structure.

As an example, FIG. 5a shows a skull target structure Z determined from a CT scan of a head, in order to match a skull norm model M to it. This matching of the norm model M to the target structure Z is carried out within an adaptation unit 15, which is likewise in the form of a software module in the processor 11 in the image computer 10.

The individual model parameters are varied for this purpose in an adaptation process in a number of iteration steps S until, in the end, all of the parameters have been individualized, that is to say they have been set such that they match, or the individualization is sufficient, that is to say the discrepancy the norm model M and the target structure Z is a minimum or is below a predetermined threshold value. Each iteration step S in this case comprises a number of process steps IV, V, VI, VII, which are carried out in the form of a loop.

The loop or the first process step S starts with the method step IV, in which the optimum parameters for translation, rotation and scaling are determined first of all. These are the parameters in the uppermost (referred to in the following text as the "0-th") hierarchy class, since these parameters affect the overall geometry. The three translation parameters $t_x$, $t_y$, $t_z$ and the three rotation parameters $r_x$, $r_y$, $r_z$ are shown schematically around the three spatial axes in FIG. 3.

Once this matching process has been carried out as far as possible, model parameters which have not yet been set are estimated from already determined parameters in a further step V. Thus, initial values for lower-level parameters are estimated from the settings of higher-level parameters. One example of this is the estimation of the knee width from the settings for a scaling parameter for the body height. This value is predetermined as the initial value for the subsequent setting of the relevant parameter. This makes it possible to speed up the method considerably. The relevant parameters are then set optimally in the method step VI.

According to an embodiment of the invention, the parameters are organized hierarchically on the basis of their influence on the anatomical overall geometry of the model. The greater the geometric effect of a parameter, the higher it is in the hierarchy. As the number of iteration steps S increases, the number of model parameters which can be set is increased at the same time, corresponding to the hierarchical organization.

Thus, in the first iteration step S or within the first run through the loop, only the parameters for the 1-th hierarchy level below the 0-th hierarchy level are used for setting the model in the step VI. In the second run, it is then possible to once again first of all subject the model to translation, rotation and scaling in the method step IV. Those model parameters in the 2nd hierarchy class which have not yet been determined are then estimated from already determined parameters in the method step V, and are then added for setting in step VI. This method is then repeated n-times, with all of the parameters in the n-th stage being optimized in the n-th iteration step, and the final step VII in the iteration step S once again being used to determine whether any further parameters are still available which have not yet been optimized.

A new (n+1)-th iteration step is then started once again, with the model first of all being moved, rotated or scaled appropriately once again, and, finally, it is possible to set all of the parameters again in series, with the parameters in the (n+1)-th class now also being available. Another check is then carried out in the method step VII to determine whether all of the parameters have been individualized, that is to say whether there are still any parameters which have not yet been optimized, or whether the desired matching has already been achieved.

Figure 5B:
Figure 5C:
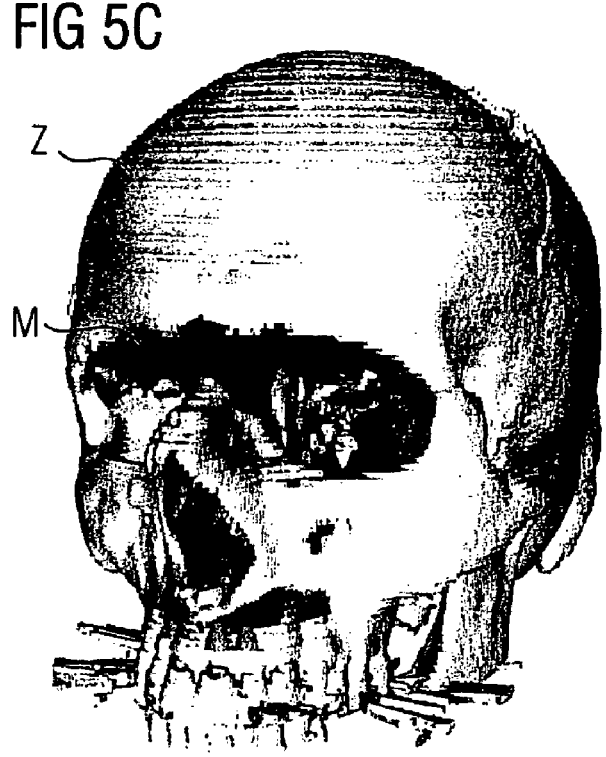
Figure 5D:
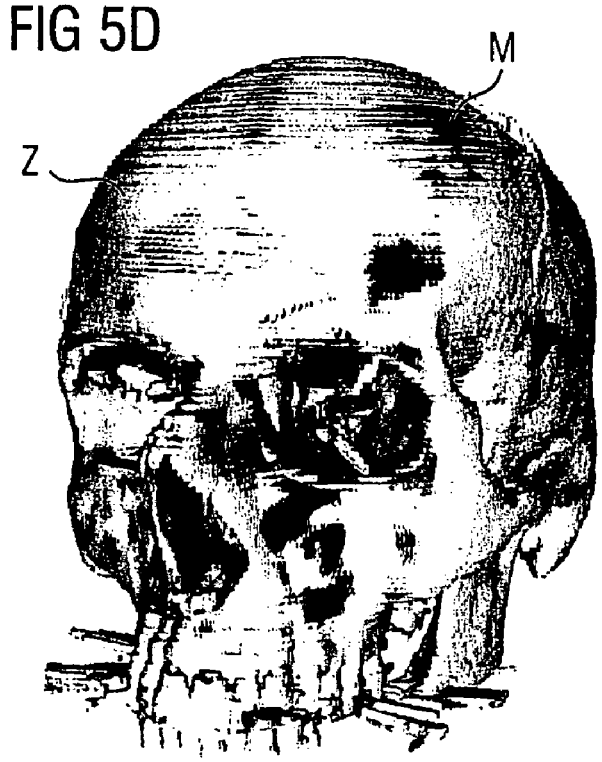

FIGS. 5b to 5d show a very simple case of a matching process such as this. This figure once again shows the model M as a continuous surface, in order to assist clarity. FIG. 5b shows the target structure Z with the model M shifted with respect to it. The image illustrated in FIG. 5c is then obtained by simple translation, rotation and scaling, with the model M actually being relatively well matched to the target structure Z in this image. Finally, the matching achieved in FIG. 5d is obtained by setting further, lower-level parameters.

The iteration method described above ensures that matching is carried out as effectively and in as time-saving a manner as possible. In this case, during the matching process, both the target structure Z and the associated model M as well as the currently calculated discrepancy values and the currently calculated value of a discrepancy function can be displayed on the screen 6 of the console 5 at any time during the matching process. Further, the discrepancies can also be visualized, as illustrated in FIGS. 5c to 5d. In addition, the discrepancy can also be visualized by appropriate coloring.

The lower-level hierarchy classes are obtained from quantitative analysis of the geometry influence. To do this, each parameter is changed and the resultant discrepancy between the geometrically changed model and the initial state is calculated. This discrepancy may be quantified, for example, by the sum of the geometric distances between corresponding model triangles, when triangle-based surface models are used, as illustrated in FIGS. 4a and 4b. The parameters can then be split into the hierarchy class by presetting numerical intervals for the discrepancy. In this case, it is quite probable that different parameters will form in the same hierarchy class. This is dependent inter alia on the width of the numerical intervals for the discrepancies. As explained above, these parameters in the same hierarchy class are offered for changing for the first time at the same time within a specific iteration step S, or are changed automatically in an appropriate form in an automatic matching method.

As already mentioned, this method preferably makes use of model parameters which are directly linked to one or more positions of specific anatomical markers in the model. On the one hand, this has the advantage that only medically sensible transformations of the model are carried out. On the other hand, this has the advantage that the medically trained user will generally know these anatomical landmarks and can thus work quite well with these parameters. One example of a parameter such as this is the distance $d_{12}$ shown in FIG. 3a between the anatomical landmarks $L_1$, $L_2$, which each occur on the spinae iliacae anteriores superiores of the pelvis norm model in FIG. 3a.

In the present implementation of the method according to an embodiment of the invention, the user can, for example, use a mouse pointer to select one of the anatomical landmarks $L_1$, $L_2$ on the spinae iliacae anteriores superiores and change its position interactively. In this way, he can vary the distance between the distantia spinarum, that is to say the length of the distance $d_{12}$, and can thus vary the entire pelvis geometry. FIG. 3a shows a model state in which the distance $d_{12}$ has been reduced, while FIG. 3b shows a model state in which the distance $d_{12}$ has been increased.

In the same way, the user can also, for example, change the distance $d_{34}$ between the anatomical marker $L_3$ on the top of the sacrum $T_3$ and the anatomical marker $L_4$ on the symphysis pubica $T_4$. Since the two parameters $d_{12}$, $d_{34}$ have approximately the same influence on the overall geometry of the norm module M of the pelvis, these parameters are in this case arranged in the same hierarchy class and can be changed by the user within the same iteration step S, or are varied automatically in this iteration step S.

Figure 6:
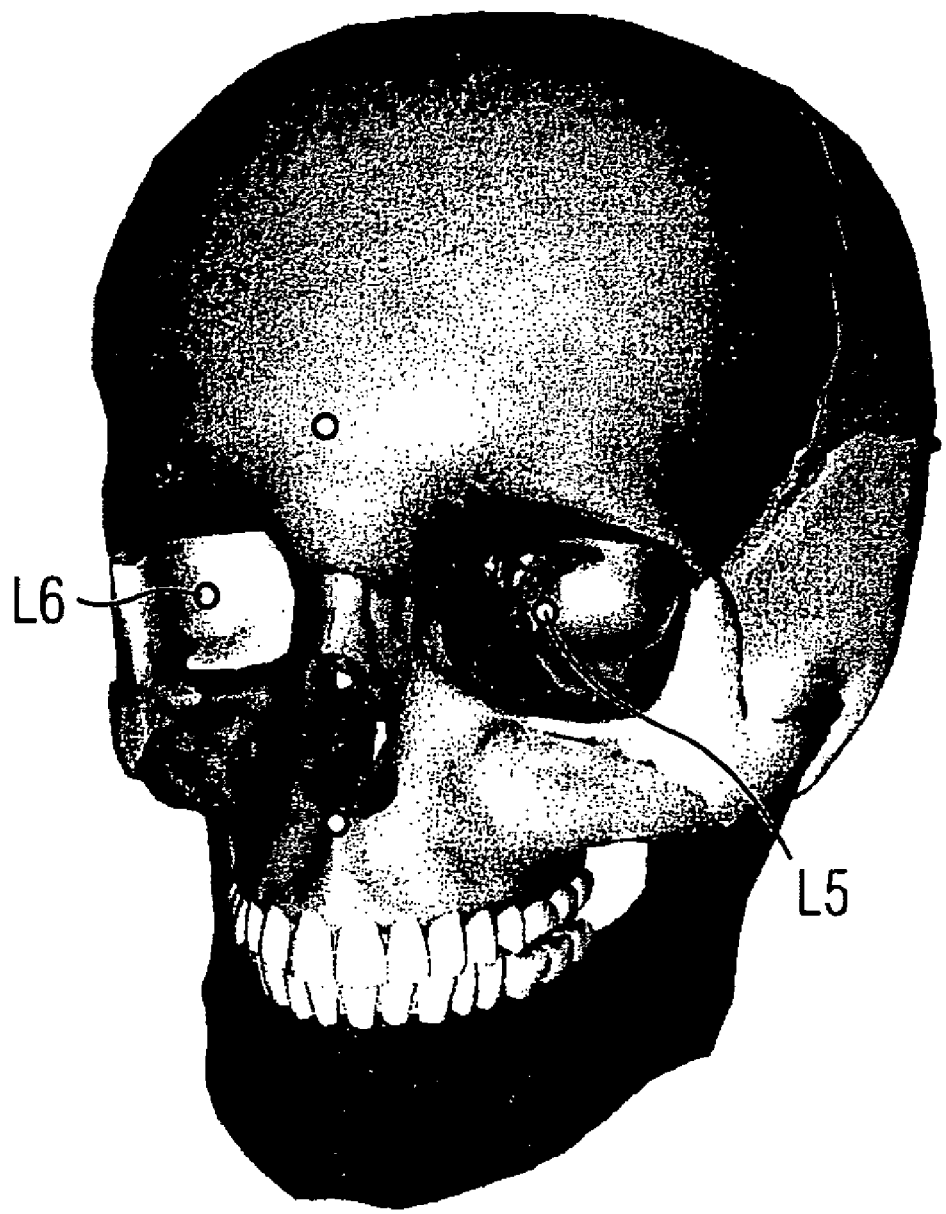
FIG. 6 shows an illustration of possible anatomical landmarks on a human skull.

Another typical example in which the distances between two landmarks are organized in different classes, can be explained with reference to the anatomical markers on a skull model. A front view of a skull model with different anatomical landmarks is shown in FIG. 6. A skull model such as this is defined by parameters including the distance between the two orbital sockets (eye sockets), that is to say between the markers $L_5$, $L_6$ positioned there, as well as the difference between the two processi styloidei, which are small bony projections on the base of the skull (although these cannot be seen in the view in FIG. 6).

In this case, the geometrical effect of the first parameter, which indicates the distance between the orbitals, is greater than the geometric effect of the second parameter, which indicates the distance between the processi styloidei. This can be examined by varying the geometry of the model while changing the parameters by one millimeter. Since the processi styloidei are relatively small structures, the geometrical model change is restricted to a small area around these bony projections.

In contrast, the orbital sockets are relatively much larger. If the distance between the orbitals is changed, a component of the model which occurs more than once will change its geometry, leading to an increased discrepancy. The parameter represented by the distance between the orbitals is thus arranged in a considerably higher hierarchy class than the change in the distance between the processi styloidei since, in principle, parameters with a greater geometric range in the parameter hierarchy are at a higher level than parameters with a more local effect.

When a model parameter $d_{12}$, $d_{34}$ which in this case includes, as described here, a distance between two anatomical landmarks $L_1$, $L_2$, $L_3$, $L_4$ in the norm model M is varied, the geometry of the norm model M is preferably deformed in an area along a straight line between the anatomical landmarks $L_1$, $L_2$, $L_3$, $L_4$ in proportion to the change in the distance. This is illustrated for the distance $d_{12}$ in the FIGS. 3a and 3b.

In the event of variation of a model parameter $d_{12}$, which includes the change in the position of the first anatomical landmark, in this case as an example the landmark $L_1$ of the norm model M relative to an adjacent landmark, for example in this case the landmarks $L_3$, $L_4$, the geometry of the norm model M is preferably deformed in an appropriate manner in an area U surrounding the relevant first anatomical landmark $L_1$ in the direction of the relevant adjacent landmarks $L_3$, $L_4$. In this case, the deformation advantageously decreases as the distance a from the relevant first anatomical landmark $L_1$ increases. Thus, the deformation in the close area around the landmark $L_1$ is greater than in those areas which are further away from it, in order to achieve the effect illustrated in FIGS. 3a and 3b. However, other transformation rules are also feasible, provided that they lead to anatomically sensible transformations. This may be dependent on the respectively selected model.

When, finally, sufficient matching has been achieved, then the actual segmentation process is carried out in the method step VIII. This is done in a separation unit 16, which is likewise in the form of a software module within the processor 11. In this case, all the pixels within the section image data located within a contour of the model or of a part of interest thereof are selected. For this purpose, by way of example, the relevant pixels are deleted from the image data or all the other data items are deleted, so that only the desired pixels remain. The separated element can then be processed further as required.

As this point, it should once again be stated expressly that the system architectures and processes illustrated in the figures are only exemplary embodiments, whose details may be varied by those skilled in the art without any problems. In particular, the control device 3 (provided that, for example, it has an appropriate console) may also have all the corresponding components of the image computer 10 in order to carry out the image processing in accordance with the method according to the invention directly there.

In this case, in consequence, the control device 3 itself forms the image processing system according to an embodiment of the invention, and there is no need for a further workstation or a separate image computer. Incidentally, it is not absolutely essential for the various components of an image processing system according to the invention to be implemented in a processor or in image computer or the like, and, rather than this, the various components may also be distributed between a number of processors or between computers which are networked with one another.

Incidentally, it is possible to retrofit existing image processing systems (in which already known post-processing processes are implemented) with a process control unit according to the invention in order additionally to use these systems in accordance with the method according to the invention as described above. In many cases, it may possibly also be sufficient to update the control software with suitable control software modules.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for segmentation of section image data of an examination object for separation of at least one object element, comprising:
   selecting an anatomical norm model on the basis of the section image data to be segmented, the geometry of the norm model being variable on the basis of model parameters, the model parameters being organized hierarchically on the basis of their influence on the anatomical overall geometry of the model;
   matching, by an image computer, the norm model to a target structure, determined in the section image data, for individualization purposes in a number of iteration steps, wherein the number of model parameters being increased in accordance with their hierarchical organization as the number of iteration steps increases; and
   selecting, by the image computer, all of those pixels within the section image data, which at least one of lie within a contour of the individualized model or model element, and which differ from this individualized model or model element by at most a specific difference value.

2. The method as claimed in claim 1, wherein the model parameters are each associated with one hierarchy class.

3. The method as claimed in claim 2, wherein a model parameter is associated with a hierarchy class on the basis of a discrepancy in the model geometry which occurs when the relevant model parameter is changed by a specific value.

4. The method as claimed in claim 3, wherein different hierarchy classes are associated with specific value ranges of discrepancies.

5. The method as claimed in claim 4, wherein those model parameters whose variation results in the norm model are varied globally, are arranged in the uppermost hierarchy class, whose model parameters is setable in a first iteration step.

6. The method as claimed in claim 3, wherein those model parameters whose variation results in the norm model are varied globally, are arranged in the uppermost hierarchy class, whose model parameters is setable in a first iteration step.

7. The method as claimed in claim 2, wherein those model parameters whose variation results in the norm model are varied globally, are arranged in the uppermost hierarchy class, whose model parameters is setable in a first iteration step.

8. The method as claimed in claim 1, wherein surface models produced on a triangle basis are used as norm models.

9. The method as claimed in claim 8, wherein the discrepancy is determined on the basis of the sum of the geometric distance between corresponding triangles of the unchanged norm model and of the changed norm model.

10. The method as claimed in claim 1, wherein the target structure of the object element to be separated m the section image data is at least partially determined automatically by way of a contour analysis method.

11. The method as claimed in claim 1, wherein a current discrepancy value between the geometry of the modified norm model and the target structure is in each case determined on the basis of a specific discrepancy function during the matching of the norm model to the target structure.

12. The method as claimed in claim 1, wherein the model parameters are offered to a user for variation in order to carry out iteration steps, based on their hierarchical organization.

13. The method as claimed in claim 1, wherein the model parameters are changed on the basis of their hierarchical organization in an automatic matching method so as to minimize the discrepancy function.

14. The method as claimed in claim 1, wherein a current value of the discrepancy function is indicated to a user in each iteration step.

15. The method as claimed in claim 1, wherein the model parameters are each logically linked to a position of at least one anatomical landmark in the relevant norm model such that the model has an anatomically sensible geometry for each parameter set.

16. The method as claimed in claim 15, wherein, when a model parameter which includes a distance between two anatomical landmarks in the norm model is varied, the geometry of the norm model is deformed in proportion to the distance change in an area along a straight line between the anatomical landmarks.

17. The method as claimed in claim 16, wherein, when a model parameter which includes a change in the position of a first anatomical landmark of the norm model relative to an adjacent landmark is varied, the geometry of the norm model is also deformed in a matching form in an area surrounding the relevant first anatomical landmark.

18. The method as claimed in claim 15, wherein, when a model parameter which includes a change in the position of a first anatomical landmark of the norm model relative to an adjacent landmark is varied, the geometry of the norm model is also deformed in a matching form in an area surrounding the relevant first anatomical landmark.

19. The method as claimed in claim 18, wherein the amount of deformation decreases as the distance from the relevant first anatomical landmark increases.

20. A computer program product embodied in a computer readable medium and having program code means in order to carry out all the steps of a method as claimed in claim 1 when the program product is run on an image processing system.

21. A method for production of a norm model whose geometry is variable on the basis of model parameters, for use in a method as claimed in claim 1, with the model parameters being organized hierarchically on the basis of their influence on the anatomical overall geometry of the model.

22. The method as claimed in claim 21, wherein the model parameters are associated with different hierarchy classes.

23. The method as claimed in claim 22, wherein a model parameter is associated with a hierarchy class on the basis of a discrepancy in the model geometry which occurs when the relevant model parameter is changed by a specific value.

24. A computer program product embodied in a computer readable medium and having program code means in order to carry out all of the steps in a method as claimed in claim 23 when the program product is run on a computer.

25. A computer program product embodied in a computer readable medium and having program code means in order to carry out all of the steps in a method as claimed in claim 22 when the program product is run on a computer.

26. A computer program product embodied in a computer readable medium and having program code means in order to carry out all of the steps in a method as claimed in claim 21 when the program product is run on a computer.

27. An image processing system for segmentation of section image data of an examination object for separation of at least one object element, comprising:
   an interface for reception of the section image data which has been measured by a measurement device and is to be segmented;
   a target structure determination unit for determination of a target structure in the section image data;
   a memory device having a number of anatomical norm models for different target structures in the section image data, whose geometry is variable on the basis of model parameters, the model parameters being organized hierarchically on the basis of their influence on the anatomical overall geometry of the model;
   a selection unit for selection of one of the anatomical normal models on the basis of the section image data to be segmented;
   an adaptation unit in order to match the selected norm model to the target structure in the section image data for individualization purposes in a number of iteration steps, with the number of model parameters which can be set being increased in accordance with their hierarchical organization as the number of iteration steps increases; and
   a separation unit in order to select all of the pixels within the section image data which at least one of lie within a contour of the individualized model or model element, and which differ from this individualized model or model element by at most a specific difference value.

28. A device for measurement of section image data of an examination object comprising an image processing system as claimed in claim 27.

29. An image processing system for segmentation of section image data of an examination object for separation of at least one object element, comprising:
   means for selecting an anatomical norm model on the basis of the section image data to be segmented, the geometry of the norm model being variable on the basis of model parameters, the model parameters being organized hierarchically on the basis of their influence on the anatomical overall geometry of the model;
   means for matching the norm model to a target structure, determined in the section image data, for individualization purposes in a number of iteration steps, wherein the number of model parameters being increased in accordance with their hierarchical organization as the number of iteration steps increases; and
   means for selecting all of those pixels within the section image data, which at least one of lie within a contour of the individualized model or model element, and which differ from this individualized model or model element by at most a specific difference value.

30. A device for measurement of section image data of an examination object comprising an image processing system as claimed in claim 29.

* * * * *